(No Model.)
R. B. AYRES.
GANG PLANK.
No. 308,867. Patented Dec. 9, 1884.
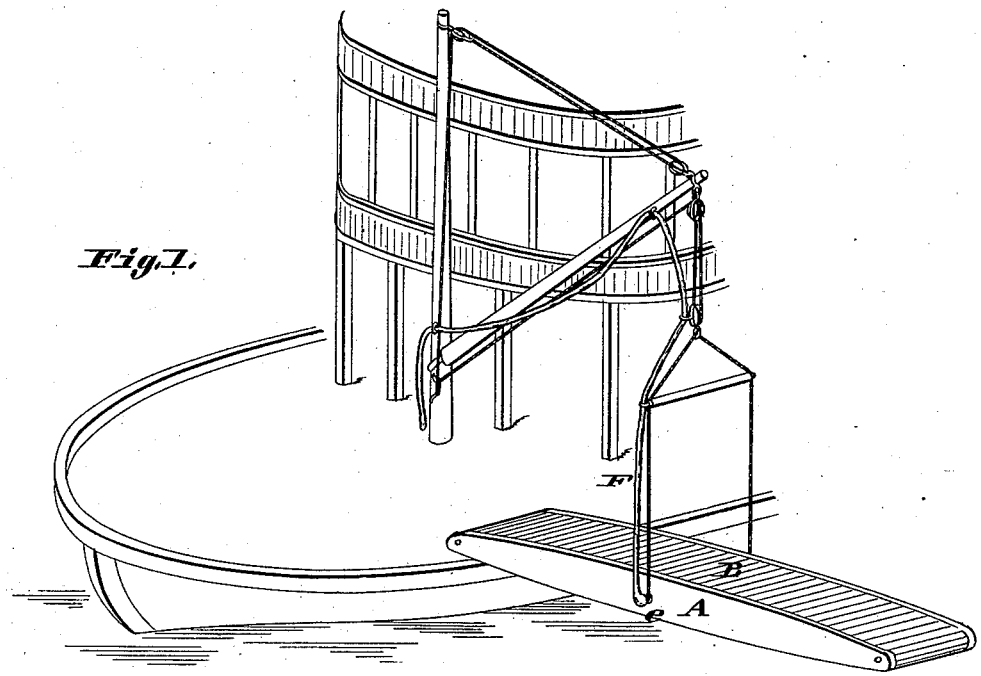
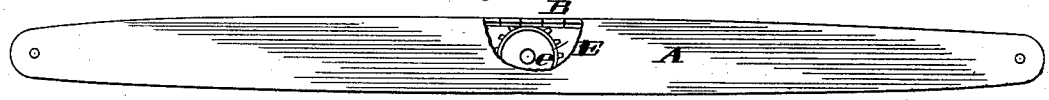
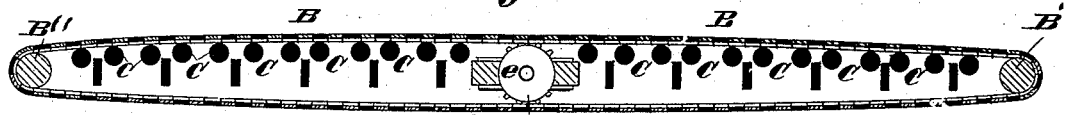
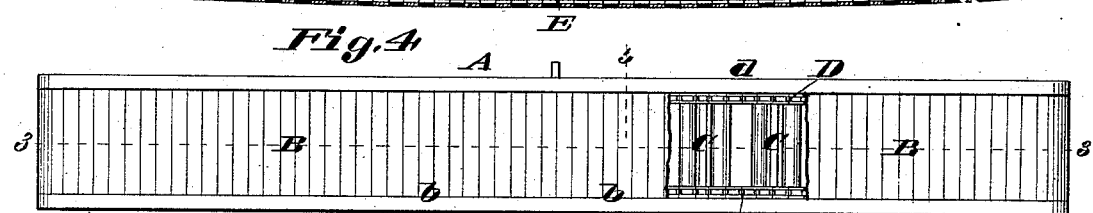
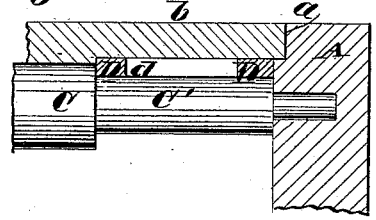
Attest:
Charles Pickles
J. Hornsby
Inventor
R. B. Ayres
Paul Bakewell
att'y

UNITED STATES PATENT OFFICE.

RUBEN B. AYRES, OF ST. LOUIS, MISSOURI.

GANG-PLANK.

SPECIFICATION forming part of Letters Patent No. 308,867, dated December 9, 1884.

Application filed July 11, 1884. (No model.)

*To all whom it may concern:*

Be it known that I, RUBEN B. AYRES, a citizen of the United States, residing at the city of St. Louis, State of Missouri, have invented a new and useful Improvement in Gang-Planks, of which the following is a full, clear, and exact description, reference being had to the annexed drawings, making part of this specification, in which—

Figure 1 is a perspective view showing manner of handling gang-planks; Fig. 2, a side elevation of gang-plank; Fig. 3, a vertical longitudinal section on line 3 3 of Fig. 4; Fig. 4, a plan of my improved gang-plank with section broken away, showing rollers and endless chain; Fig. 5, a detail vertical section on line 5 5 of Fig. 4.

The object of my invention is mainly to save labor and time in loading and unloading a boat; and to that end I provide a gang-plank with a movable tramway, which tramway can be set in motion or kept at rest at will.

The construction and operation of my invention are as follows:

A A is the frame-work or side pieces of my improved gang-plank; $a$, longitudinal slot on side pieces, A A; B, tramway; $b$, cross-pieces of tramway; B' B'', large rollers; C C, &c., series of rollers; D D, endless chains; $d$, openings in endless chains; E, cog-wheel; $e$, cog-wheel shaft; F, flexible steam-tube.

To contain the internal working parts, my gang-plank is made hollow, and with a view to strength it is made slightly convex in form, as shown in Figs. 1, 2, and 3.

Journaled in bearings in the frame-work pieces A A, at either end of same, are large rollers B' B'', and journaled in bearings in frame-work pieces A A are the series of rollers C C, &c. The tramway is composed of cross-pieces $b\,b\,b$, &c., and the ends of these cross-pieces are carried along the line of the longitudinal slots $a$ of the frame-work pieces A A'. Underneath and near the ends of these cross-pieces $b\,b\,b$, &c., which compose the tramway, and attached to the same, and resting upon the depressions C' of the series of rollers C C C, &c., is the endless chain D. This endless chain D is provided with openings $d$ at equal distances apart along entire length of chain, and cogs on cog-wheel E mesh into these chain-openings in operation of this device.

In my invention the endless chain D and cog-wheel E and their respective connection and relative arrangements with tramway and rollers and frame-work are duplicated—that is to say, there are two chains D and two cog-wheels E, both cog-wheels being on same cog-wheel shaft, $e$, all arranged in same manner and performing same functions.

The operation of my invention is as follows: Rotary motion is imparted to cog-wheel E through cog-wheel shaft $e$ by any of the well-known methods of imparting rotary motion to shafting. Motion being imparted to cog-wheels E, their cogs mesh into openings $d$ in endless chains D, and endless chains D being attached to cross-pieces $b\,b$ of movable tramway B, thereby imparting motion to tramway B, and endless chains D find support and movable bearings in depressions C' on series of rollers C C, &c., and on large rollers B' B'', and the movable tramway is thus carried along rollers C and around large rollers B' B'' in a continuous circuit. The result is that instead of using men to carry freight from landing to boat or from boat to landing, as heretofore done, freight is carried along gang-plank by the movable tramway.

This gang-plank can, when desired, be used with its tramway stationary by locking the cog-wheel shaft $e$; and the direction of motion of tramway B is governed by direction of rotation of cog-wheel shaft $e$.

In the drawings, Fig. 1, I show an arrangement for carrying steam, by means of flexible tube marked F, from boilers of boat along line of rope and pulleys to a small engine placed in center of my hollow gang-plank, by means of all of which motion is imparted to cog-wheel shaft $e$; but, as stated herein, the matter of imparting motion to cog-wheel shaft $e$ may be done in any suitable manner.

I claim—

1. A gang-plank having frame-work pieces A A, provided with longitudinal slots $a$, said frame-work pieces being the side pieces of gang-plank, and acting as supports for end rollers, B B', series of rollers C, and a cog-wheel-driving shaft, $e$, internally located in center of gang-plank, in combination with movable tramway B, said tramway being attached to endless chain D and cog-wheel E, when arranged and operated substantially as described.

2. In a gang-plank with a movable tramway, the frame-work pieces A A, in which are hung, as described, end rollers, B' B'', series of rollers C, and cog-wheel shaft e, movable tramway B, endless chain D, having openings d, said tramway B and endless chain D being connected so as to move together in same direction, and cog-wheel E, substantially as described.

In testimony whereof I have affixed my signature, in presence of two witnesses, this 11th day of June, 1884.

RUBEN B. AYRES.

Witnesses:
PAUL BAKEWELL,
FERNANDO SAUTER.